(12) United States Patent
Andrews

(10) Patent No.: US 11,512,720 B2
(45) Date of Patent: Nov. 29, 2022

(54) VALVE ASSEMBLIES TO SUPPLY FLUID PRESSURE TO COMPONENTS IN MULTIPLE TRANSMISSION OPERATING MODES

(71) Applicant: ALLISON TRANSMISSION, INC., Indianapolis, IN (US)

(72) Inventor: Kenneth M. Andrews, Greenwood, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 608 days.

(21) Appl. No.: 16/665,170

(22) Filed: Oct. 28, 2019

(65) Prior Publication Data

US 2021/0123463 A1 Apr. 29, 2021

(51) Int. Cl.
*F15B 15/20* (2006.01)
*F15B 21/041* (2019.01)
(Continued)

(52) U.S. Cl.
CPC ........ *F15B 15/202* (2013.01); *B01D 35/1573* (2013.01); *F15B 21/041* (2013.01);
(Continued)

(58) Field of Classification Search
CPC ..... F16K 3/28; F16K 3/15; F16K 3/18; F16K 3/182; F16K 15/1481; F16H 57/0402;
(Continued)

(56) References Cited

U.S. PATENT DOCUMENTS 2,057,932 A 10/1936 Bolser
3,056,501 A 10/1962 Thorman et al.
(Continued)

FOREIGN PATENT DOCUMENTS

CN 202252156 U 5/2012
CN 103470798 B 4/2016
(Continued)

OTHER PUBLICATIONS

Ford 6.0L Powerstroke Diesel Oil Filter Housing Check Valve Anti-Drain 3C3Z6800A, ebay, https://www.ebay.com/itm/Ford-6-0L-Powerstroke-Diesel-Oil-Filter-Housing-Check-Valve-Anti-Drain-3C3Z6800A-/231263727330, 1 page.

*Primary Examiner* — Atif H Chaudry
(74) *Attorney, Agent, or Firm* — Taft Stettinius & Hollister LLP; Stephen F. Rost

(57) ABSTRACT

Transmissions, filter assemblies for transmissions, and valve assemblies for transmissions are disclosed herein. A transmission includes an input shaft, an output shaft, and a hydraulic system. The input shaft is configured to receive rotational power supplied by a drive unit. The output shaft is coupled to the input shaft and configured to provide rotational power supplied to the input shaft to a load. The hydraulic system is configured to supply fluid to one or more fluid demand devices coupled between the input shaft and the output shaft in one or more operating modes of the transmission. The hydraulic system includes a filter assembly having a filter element and a valve assembly fluidly coupled to the filter element.

20 Claims, 8 Drawing Sheets

(51) Int. Cl.
*F16K 3/24* (2006.01)
*F16K 3/26* (2006.01)
*B01D 35/157* (2006.01)

(52) U.S. Cl.
CPC ............... *F16K 3/243* (2013.01); *F16K 3/26* (2013.01); *F15B 2015/206* (2013.01)

(58) Field of Classification Search
CPC ............ F16H 57/0404; F16H 61/0206; F16H 61/0021; F16H 2061/0037; F16D 2048/0221; F15B 21/041; F15B 15/202; B01D 35/1573
See application file for complete search history.

(56) References Cited

U.S. PATENT DOCUMENTS

| | | | | |
|---|---|---|---|---|
| 3,062,496 | A | * | 11/1962 | Stehlin ................. F16K 3/28 251/324 |
| 4,541,613 | A | * | 9/1985 | Barbe ................... F16K 3/28 251/327 |
| 6,637,551 | B2 | | 10/2003 | Heath et al. |
| 7,217,357 | B2 | | 5/2007 | Rosendahl et al. |
| 7,296,594 | B1 | | 11/2007 | Phanco |
| 7,871,364 | B2 | | 1/2011 | Herman |
| 8,359,853 | B1 | * | 1/2013 | Hauser ................. F16H 39/14 475/343 |
| 2016/0178069 | A1 | * | 6/2016 | Cler ................... G05D 16/2066 137/565.11 |
| 2017/0296947 | A1 | * | 10/2017 | Chikugo ................ F15B 1/26 |

FOREIGN PATENT DOCUMENTS

| | | |
|---|---|---|
| CN | 104667595 B | 8/2016 |
| EP | 2896856 B1 | 12/2016 |

\* cited by examiner

VALVE ASSEMBLIES TO SUPPLY FLUID PRESSURE TO COMPONENTS IN MULTIPLE TRANSMISSION OPERATING MODES

FIELD OF THE DISCLOSURE

The present disclosure relates, generally, to filter assemblies for transmissions, and, more specifically, to filter assemblies incorporating valve assemblies to supply fluid pressure to fluid demand devices and/or systems in multiple transmission operating modes.

BACKGROUND

During use in certain operational modes, performance of conventional valves such as ball check valves, for example, may be limited by space constraints of the installation environment and/or fluid flow demands of components to which the valves supply fluid. Additionally, complications may arise when such valves are employed to supply fluid from multiple sources (e.g., multiple pumps) to components in multiple operating modes of transmissions. Accordingly, valve configurations that avoid the shortcomings associated with conventional valves remain an area of interest.

SUMMARY

The present disclosure may comprise one or more of the following features and combinations thereof.

According to one aspect of the present disclosure, a transmission for a vehicle may include an input shaft, an output shaft, and a hydraulic system. The input shaft may be configured to receive rotational power supplied by a drive unit. The output shaft may be coupled to the input shaft and configured to provide rotational power supplied to the input shaft to a load. The hydraulic system may be configured to supply fluid to one or more fluid demand devices coupled between the input shaft and the output shaft in one or more operating modes of the transmission. The hydraulic system may include a filter assembly having a filter element and a valve assembly fluidly coupled to the filter element. The valve assembly may include a housing and a spool. The housing may have an interior chamber. The spool may be movable in the interior chamber between a de-stroked position, in which the spool permits fluid flow through the valve assembly to the one or more fluid demand devices substantially without application of fluid pressure to the spool by fluid passed through the filter element, and a stroked position, in which the spool permits fluid flow through the valve assembly to the one or more fluid demand devices in response to fluid pressure applied to the spool by fluid passed through the filter element. The spool may be formed to include a plurality of spiraled slots shaped to conduct fluid therethrough when the spool is in the stroked position to improve fluid flow to the one or more fluid demand devices through the valve assembly.

In some embodiments, when the spool is in the de-stroked position, the spool may block fluid backflow through the valve assembly to the filter element. Additionally, in some embodiments, the one or more operating modes may include a first operating mode in which fluid is supplied to the one or more fluid demand devices by a first pump of the hydraulic system that is mechanically driven by the drive unit, and when the transmission is in the first operating mode, the spool may be in the stroked position such that the spool permits flow of fluid supplied by the first pump through the valve assembly to the one or more fluid demand devices. The one or more operating modes may include a second operating mode in which fluid is supplied to the one or more fluid demand devices by a second electrically-driven pump of the hydraulic system, and when the transmission is in the second operating mode, the spool may be in the de-stroked position such that the spool permits flow of fluid supplied by the second pump through the valve assembly to the one or more fluid demand devices.

In some embodiments, the valve assembly may include a biasing element arranged in contact with the housing and the spool to bias the spool toward the de-stroked position and a snap ring positioned in the interior chamber to restrict movement of the spool in the interior chamber. The housing may include a cover that retains the snap ring and has a pair of support ribs, and the pair of support ribs may be configured for interaction with the spool to guide movement of the spool in the interior chamber.

In some embodiments, the spool may include a base devoid of any apertures and an annular body that extends outwardly away from the base and that has a closed end arranged adjacent the base and an open end arranged opposite the closed end, the plurality of spiraled slots may be formed in the annular body, and the base may be configured to receive fluid pressure applied by fluid passed through the filter element to cause movement of the spool in the interior chamber from the de-stroked position to the stroked position. An exterior of the annular body may be shaped for interaction with one or more interior walls of the housing that at least partially define the interior chamber to facilitate a tight-tolerance fit between the spool and the housing that resists leakage of fluid through the interior chamber around the spool. The spool and the one or more interior walls of the housing may be shaped complementary to one another and sized for interaction with one another to facilitate sealing of the interior chamber without a separate seal. Additionally, in some embodiments, the valve assembly may include a biasing element arranged in contact with the housing and the base of the spool to bias the spool toward the de-stroked position and a snap ring positioned in the interior chamber to restrict movement of the spool in the interior chamber.

According to another aspect of the present disclosure, a filter assembly for use in a hydraulic system of a transmission may include a filter element and a valve assembly. The valve assembly may be in fluid communication with the filter element. The valve assembly may include a housing and a spool. The housing may have an interior chamber. The spool may be formed to include a plurality of spiraled slots. The spool may be movable in the interior chamber between a de-stroked position, in which the spool permits fluid flow through the valve assembly to one or more fluid demand devices substantially without application of fluid pressure to the spool by fluid passed through the filter element, and a stroked position, in which the spool permits fluid flow through the spiraled slots to the one or more fluid demand devices in response to fluid pressure applied to the spool by fluid passed through the filter element. When the spool is in the de-stroked position, the spool may block fluid backflow through the valve assembly to the filter element.

In some embodiments, the spool may include a base devoid of any apertures and an annular body that extends outwardly away from the base and that has a closed end arranged adjacent the base and an open end arranged opposite the closed end, the plurality of spiraled slots may be formed in the annular body, and a first side of the base may be configured to receive fluid pressure applied by fluid passed through the filter element to cause movement of the spool in the interior chamber from the de-stroked position to the stroked position. The valve assembly may include a biasing element arranged in contact with the housing and a second side of the base arranged opposite the first side to bias the spool toward the de-stroked position and a snap ring positioned in the interior chamber to restrict movement of the spool in the interior chamber.

In some embodiments, an exterior of the annular body may be shaped for interaction with one or more interior walls of the housing that at least partially define the interior chamber to facilitate a tight-tolerance fit between the spool and the housing that resists leakage of fluid through the interior chamber around the spool, and the spool and the one or more interior walls of the housing may be shaped complementary to one another and sized for interaction with one another to facilitate sealing of the interior chamber without a separate seal. When the spool is in the de-stroked position, the one or more interior walls of the housing may substantially close off the spiraled slots of the spool to resist fluid flow therethrough.

According to yet another aspect of the present disclosure, a valve assembly for use in a hydraulic system of a transmission may include a housing, a spool, and a biasing element. The housing may have an interior chamber. The spool may be positioned in the interior chamber and formed to include a plurality of spiraled slots. The biasing element may be arranged in contact with the spool to apply a biasing force to the spool. The spool may be movable in the interior chamber between a de-stroked position, in which the spool permits fluid flow through the valve assembly to one or more fluid demand devices substantially without application of fluid pressure to the spool, and a stroked position, in which the spool permits fluid flow through the spiraled slots to the one or more fluid demand devices in response to fluid pressure applied to the spool. The biasing force may urge the spool toward the de-stroked position.

In some embodiments, the valve assembly may include a snap ring positioned in the interior chamber to restrict movement of the spool in the interior chamber. The housing may include a cover that retains the snap ring and has a pair of support ribs, and the pair of support ribs may be configured for interaction with the spool to guide movement of the spool in the interior chamber.

In some embodiments, the spool may include a base devoid of any apertures and an annular body that extends outwardly away from the base and that has a closed end arranged adjacent the base and an open end arranged opposite the closed end, the plurality of spiraled slots may be formed in the annular body, and the base may be configured to receive fluid pressure to cause movement of the spool in the interior chamber from the de-stroked position to the stroked position. An exterior of the annular body may be shaped for interaction with one or more interior walls of the housing that at least partially define the interior chamber to facilitate a tight-tolerance fit between the spool and the housing that resists leakage of fluid through the interior chamber around the spool, and the spool and the one or more interior walls of the housing may be shaped complementary to one another and sized for interaction with one another to facilitate sealing of the interior chamber without a separate seal.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
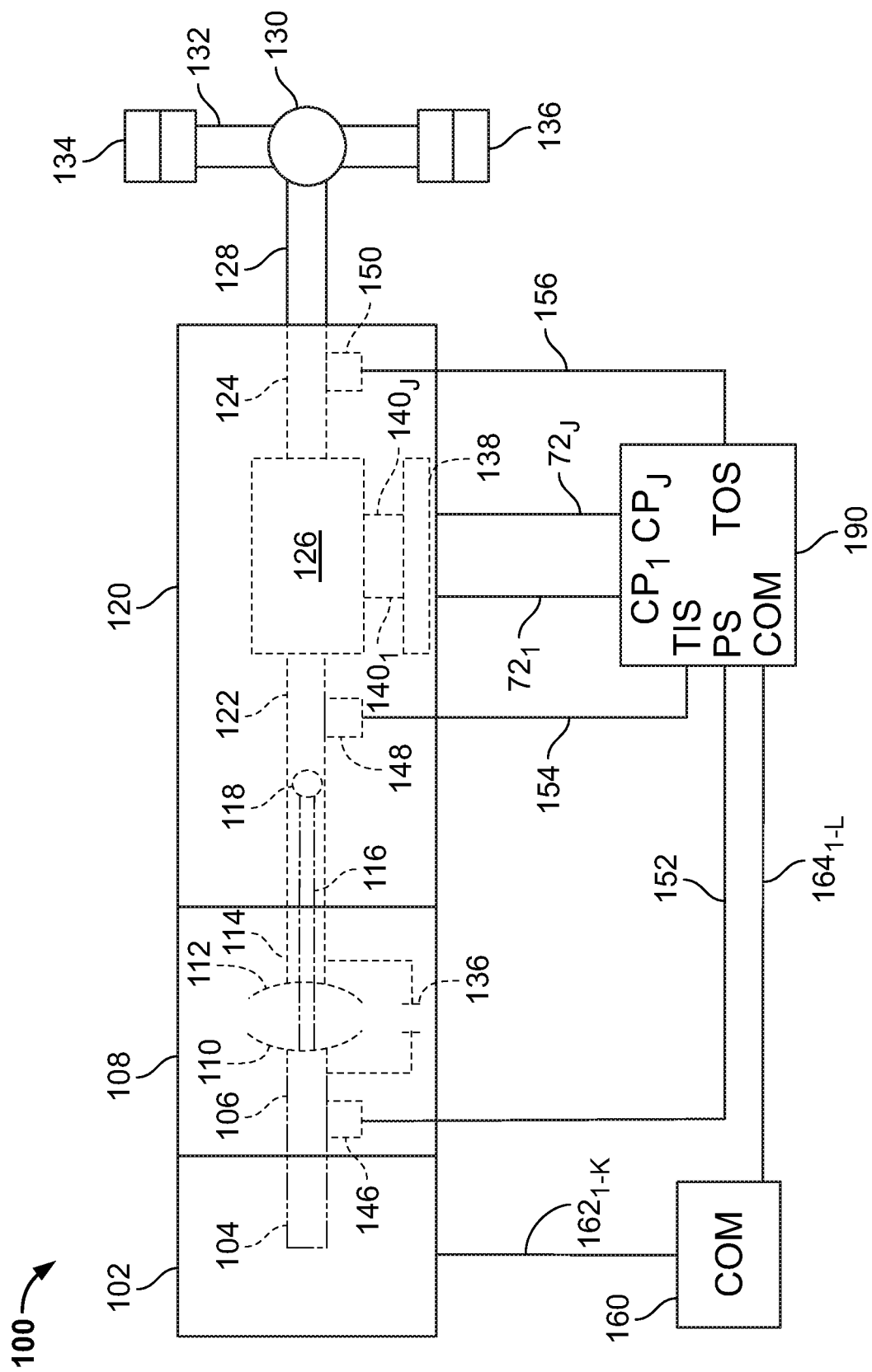
FIG. 1 is a diagrammatic view of a drive system for a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 2:
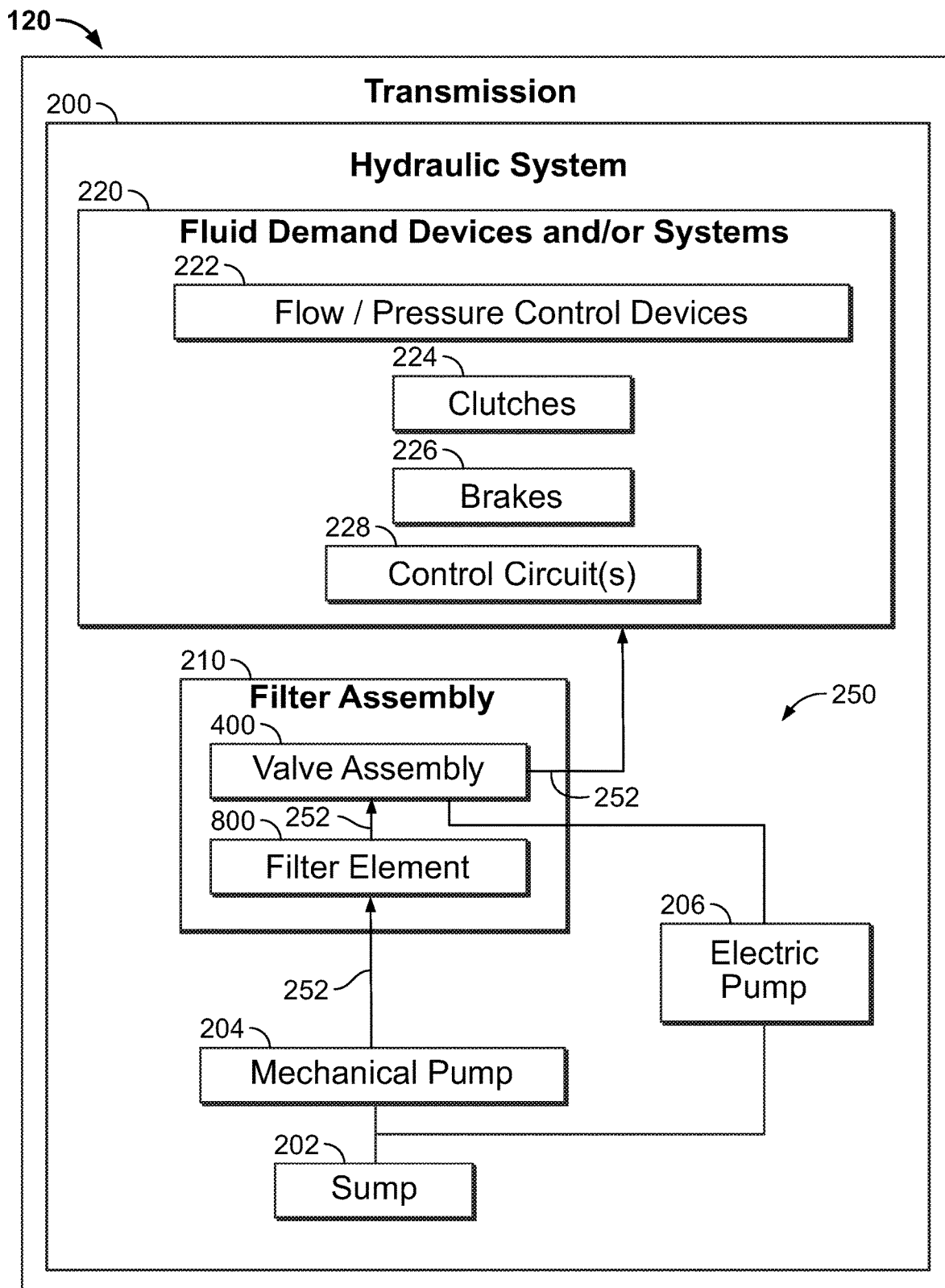
FIG. 2 is a diagrammatic view of a hydraulic system included in a transmission of the drive system of FIG. 1 showing operation of the hydraulic system in an engine runtime operating mode of the transmission.

Referring now to FIG. 1, an illustrative drive system 100 for a vehicle includes a transmission 120 that has an input shaft 122, an output shaft 124, and a hydraulic system 200 (see FIG. 2). The input shaft 122 is configured to receive rotational power supplied by a drive unit 102. The output shaft 124 is coupled to the input shaft 122 and configured to provide rotational power supplied to the input shaft 122 to a load (e.g., an axle 132 and wheels 134, 136 mounted thereto). The hydraulic system 200 is configured to supply fluid (e.g., hydraulic fluid) to one or more fluid demand devices and/or systems 220 coupled between the input shaft 122 and the output shaft 124 in one or more operating modes of the transmission 120, as described in greater detail below with reference to FIGS. 2 and 3.

Figure 6:
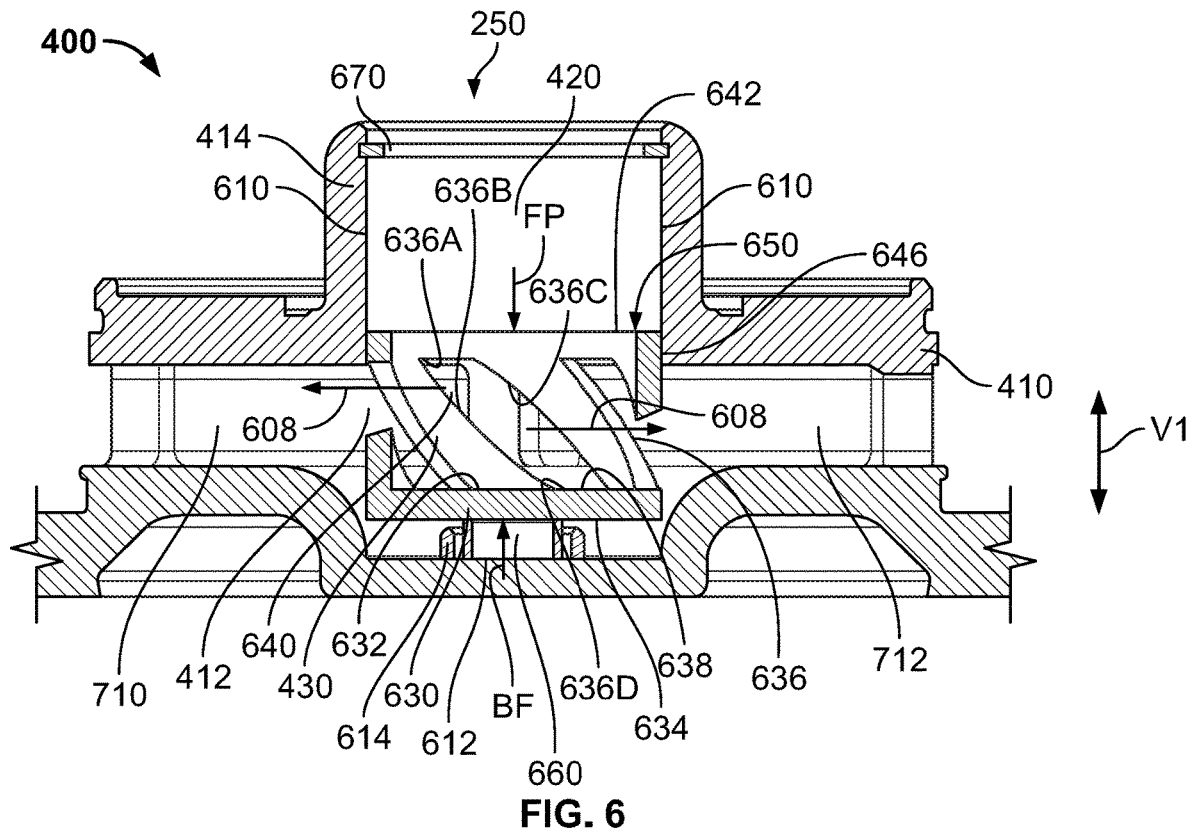
FIG. 6 is a front elevation view of the valve assembly of FIG. 4 showing operation of the valve assembly in the engine runtime operating mode of the transmission.
Figure 7:
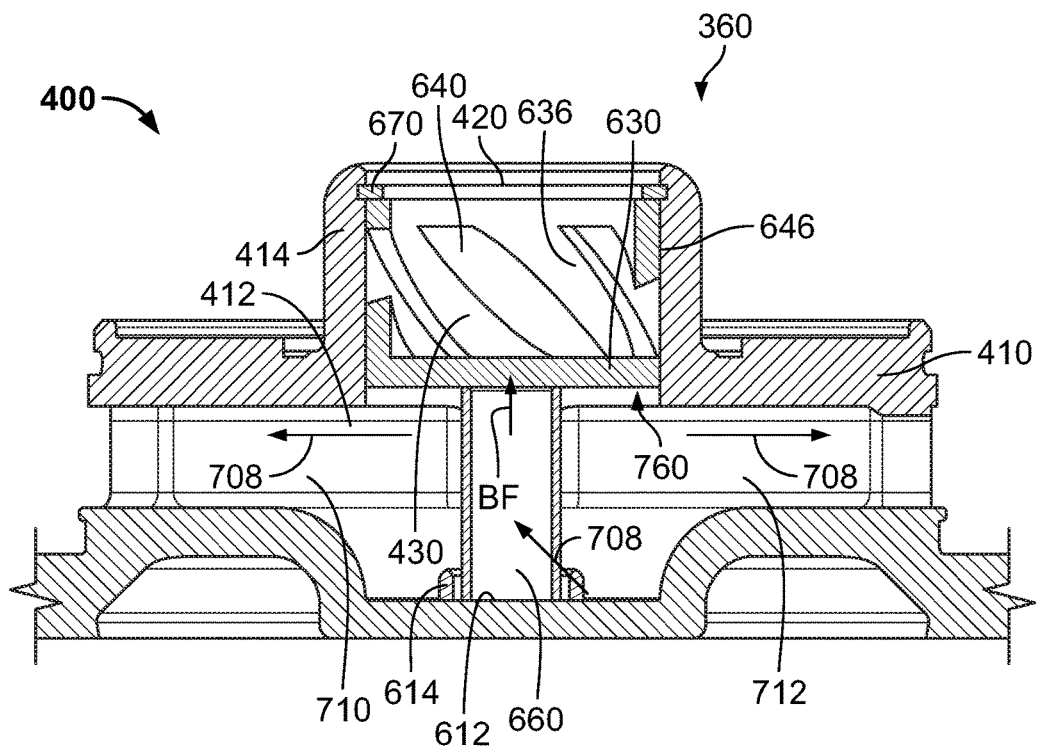
FIG. 7 is a front elevation view of the valve assembly of FIG. 4 showing operation of the valve assembly in the engine start/stop operating mode of the transmission.

In the illustrative embodiment, the hydraulic system 200 includes a filter assembly 210 that has a filter element 800 (see FIG. 8) and a valve assembly 400 (see FIG. 4) fluidly coupled to, and in fluid communication with, the filter element 800. The illustrative valve assembly 400 includes a housing 410 that has an interior chamber 412 and a spool 430 positioned in the interior chamber 412. As best seen in FIGS. 6 and 7, the spool 430 is movable in the interior chamber 412 between a de-stroked position 760 and a stroked position 650. In the de-stroked position 760, the spool 430 permits fluid flow through the valve assembly 400 to the one or more fluid demand devices 220 substantially without application of fluid pressure to the spool 430 by fluid passed through the filter element 800. In the stroked position 650, the spool 430 permits fluid flow through the valve assembly 400 to the one or more fluid demand devices 220 in response to fluid pressure applied to the spool 430 by fluid passed through the filter element 800. The illustrative spool 430 is formed to include spiraled slots 640 that are shaped to conduct fluid therethrough when the spool 430 is in the stroked position 650 to improve fluid flow to the one or more fluid demand devices 220 through the valve assembly 400.

Referring again to FIG. 1, it should be appreciated that the illustrative drive system 100 is adapted for use in one or more vehicles employed in a variety of applications. In some embodiments, the drive system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the drive system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more drive torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 122 of the transmission 120.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the hydraulic system 200, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the hydraulic system 200 (which may include an electro-hydraulic system 138) under control by a controller 190 of the transmission 120, the gearing system 126 may provide, or otherwise be associated with, one or more operating ranges selected by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134, 136. In this arrangement, the output shaft 124 drives the wheels 134, 136 through the propeller shaft 128, the universal joint 130, and the axle 132 in use of the drive system 100.

The illustrative transmission 120 includes the electro-hydraulic system 138 that is fluidly coupled to the gearing system 126 via a number (i.e., J) of fluid paths 1401-140J, where J may be any positive integer. The electro-hydraulic system 138 is configured to receive control signals provided by various electro-hydraulic control devices, such as one or more flow and/or pressure control devices 222, for example. In response to those control signals, and under control by the controller 190, the electro-hydraulic system 138 selectively causes fluid to flow through one or more of the fluid paths 1401-140J to control operation (e.g., engagement and disengagement) of one or more friction devices (e.g., clutches 224 and brakes 226) included in, or otherwise adapted for use with, the gearing system 126.

In the illustrative system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 190 via a signal path 152, and the controller 190 is operable to process the speed signal produced by the speed sensor 146 to determine the rotational speed of the pump shaft 106/drive unit output shaft 104.

In the illustrative system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 190 via a signal path 154, and the controller 190 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 190 via a signal path 156. The controller 190 is configured to process the speed signal produced by the speed sensor 150 to determine the rotational speed of the transmission output shaft 124.

In the illustrative embodiment, the electro-hydraulic system 138 includes one or more actuators configured to control various operations within the transmission 120. For example, the electro-hydraulic system 138 described herein illustratively includes a number of actuators (e.g., which may be included in the fluid demand devices 220) that are electrically connected to a number (i.e., J) of control outputs CP1-CPJ of the controller 190 via a corresponding number of signal paths 721-72J, where J may be any positive integer as described above. Each of the actuators may receive a corresponding one of the control signals CP1-CPJ produced by the controller 190 via one of the corresponding signal paths 721-72J. In response thereto, each of the actuators may control the friction applied by each of the friction devices by controlling the pressure of fluid within one or more corresponding fluid passageway 1401-140J, thereby controlling the operation of one or more corresponding friction devices based on information provided by the various speed sensors 146, 148, and/or 150 in use of the system 100.

In the illustrative embodiment, the system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 190 via a number (i.e., L) of signal paths 164, wherein L may be any positive integer. It should be appreciated that the one or more signal paths 164 may be referred to collectively as a data link. Generally, the drive unit controller 160 and the transmission controller 190 are operable to share information via the one or more signal paths 164. In one embodiment, for example, the drive unit controller 160 and the transmission controller 190 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 190 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring now to FIG. 2, the illustrative hydraulic system 200 includes a sump 202, a mechanically-driven pump 204, an electrically-operated pump 206, the filter assembly 210, and the one or more fluid demand devices and/or systems 220. Of course, it should be appreciated that the hydraulic system 200 may include other components and is not limited to the aforementioned devices. In any case, the sump 202 is fluidly coupled to or in fluid communication with each of the pumps 204, 206, and each of the pumps 204, 206 is fluidly coupled to or in fluid communication with the filter assembly 210. The valve assembly 400 of the filter assembly 210 is fluidly coupled to or in fluid communication with the one or more fluid demand devices 220.

The illustrative sump 202 is embodied as, or otherwise includes, any device or collection of devices capable of storing fluid to be supplied to other components of the hydraulic system 200 (e.g., the devices and/or systems 220) in use thereof. In some embodiments, the sump 202 may be embodied as, or otherwise include, a fluid reservoir, an oil pan, or the like. Though not shown in FIGS. 2 and 3, it should be appreciated that the hydraulic system 200 may incorporate one or more fluid circuits capable of returning fluid drawn from the sump 202 back thereto so that the fluid may again be supplied to components of the system 200.

The illustrative mechanical pump 204 is embodied as, or otherwise includes, any device or collection of devices capable of supplying fluid, or otherwise driving distribution of fluid, stored in the sump 202 to other components of the hydraulic system 200 in use of the system 200. In the illustrative embodiment, the pump 204 is mechanically driven by rotational power supplied by another component, such as the drive unit 102, for example. In some embodiments, the pump 204 may be embodied as, or otherwise included in, the pump 118. In any case, it should be appreciated that when the component driving the pump 204 is in one or more particular states (e.g., an engine start/stop mode 360 as discussed below), the pump 204 may not be driven. Therefore, at least in the one or more states of that component, another mechanism may be employed to supply fluid stored in the sump 202 to other components of the hydraulic system 200, such as the fluid demand devices and/or systems 220, for example.

The illustrative electric pump 206 is embodied as, or otherwise includes, any device or collection of devices capable of supplying fluid, or otherwise driving distribution of fluid, stored in the sump 202 to other components of the hydraulic system 200 in use of the system 200. In the illustrative embodiment, the pump 206 is electrically driven independently of operation of the drive unit 102. As such, during the one or more particular states of the component driving operation of the pump 204, the pump 206 may be used to supply fluid stored in the sump 202 to other components of the hydraulic system 200, such as the fluid demand devices and/or systems 220, for example.

Figure 3:
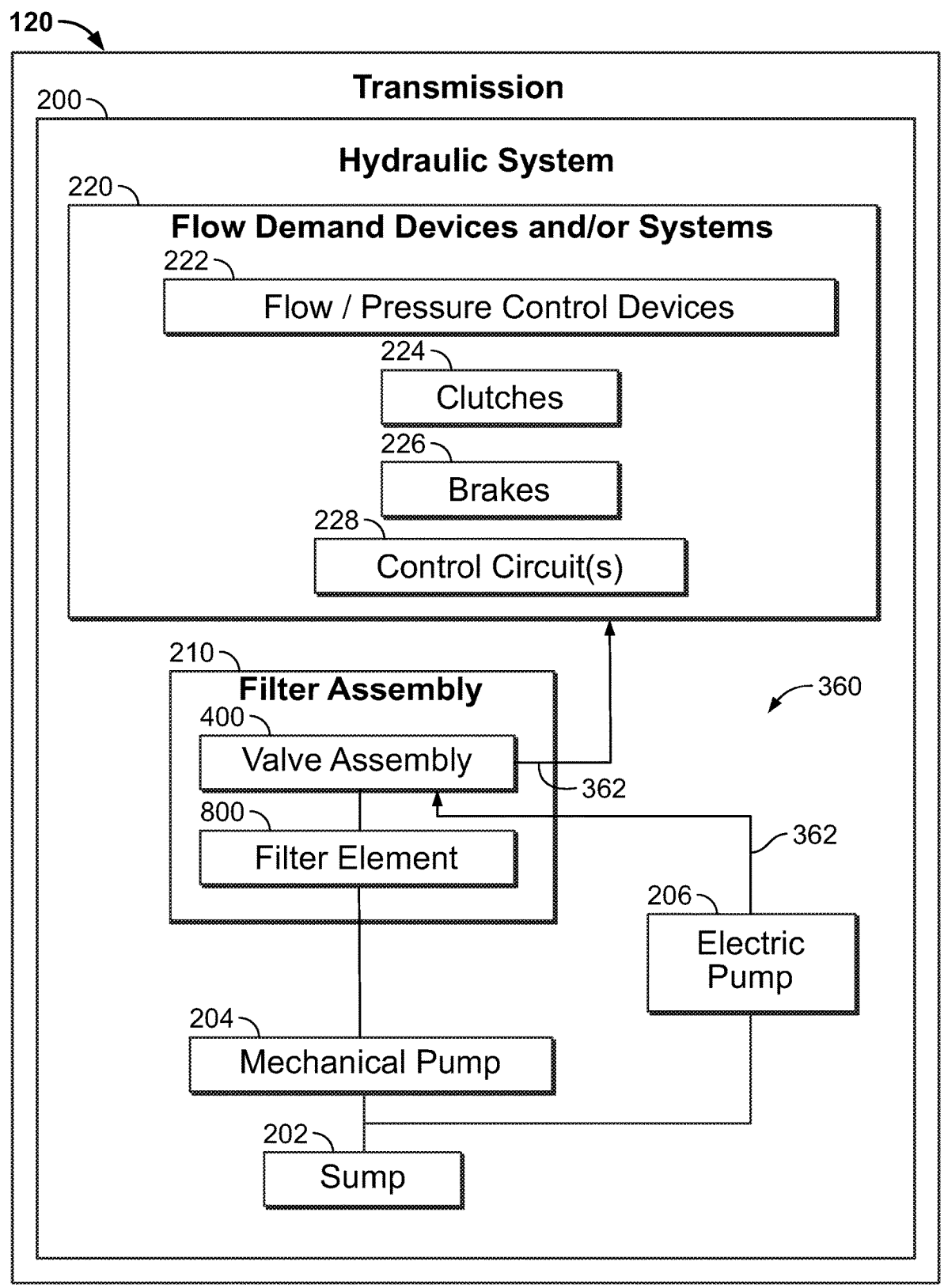
FIG. 3 is a diagrammatic view of the hydraulic system of FIG. 2 showing operation of the hydraulic system in an engine start/stop operating mode of the transmission.

In the illustrative embodiment, the fluid demand devices and/or systems 220 are embodied as, or otherwise include, any collection of devices and/or systems included in the electro-hydraulic system 138 that require fluid stored in the sump 202 to be supplied thereto during operation thereof. As depicted in FIGS. 2 and 3, the devices and/or systems 220 include flow/pressure control devices 222, clutches 224, brakes 226, and one or more control circuits 228. Of course, it should be appreciated that the fluid demand devices and/or systems 220 may include other components in addition to, or in lieu of, the aforementioned components.

The illustrative flow/pressure control devices 222 are embodied as, or otherwise include, any collection of devices capable of controlling the flow and/or pressure of fluid provided to various components, such as the clutches 224 and the brakes 226, for example. In some embodiments, the devices 222 may include, or otherwise be embodied as, one or more solenoid valves, trim valves, pressure control valves, accumulators, regulators, pressure orifice devices, restrictors, and/or the like. Of course, in other embodiments, it should be appreciated that the control devices 222 may include, or otherwise be embodied as, other suitable components.

The illustrative clutches 224 and the brakes 226 are embodied as, or otherwise include, friction devices capable of being controlled by selectively controlling the friction applied by, or otherwise associated with, each of the friction devices, such as by controlling fluid pressure applied to each of the friction devices, for example. Generally, the clutches 224 and the brakes 226 are controllably engaged and disengaged via fluid pressure supplied by, or otherwise associated with, the flow/pressure control devices 222 of the electro-hydraulic system 138. In some embodiments, changing or shifting between the various gears of the transmission 120 is accomplished by selectively controlling the clutches 224 and the brakes 226 via control of fluid pressure within various fluid paths, such as fluid paths 1401-140J, for example.

The illustrative one or more control circuits 228 are embodied as, or otherwise include, any collection of devices configured to supply and/or distribute fluid to various components of the electro-hydraulic system 138, such as the flow/pressure control devices 222, the clutches 224, and the brakes 226, for example. In some embodiments, the one or more control circuits 228 may include, or otherwise be embodied as, a main circuit, a lube circuit, a fluid return circuit, and/or any other circuit incorporated into the electro-hydraulic system 138. Additionally, in some embodiments, each of the one or more control circuits 228 may be pressurized by fluid pressure supplied by the mechanical pump 204 or the electric pump 206.

Referring now to FIGS. 2 and 3, in the illustrative embodiment, the transmission 120 is operable in an engine runtime mode 250 and an engine start/stop mode 360. In the engine runtime mode 250, fluid is supplied to the fluid demand devices and/or systems 220 by the mechanical pump 204. More specifically, as indicated by arrows 252, fluid is supplied to the devices and/or systems 220 by the pump 204 in the mode 250 through the filter element 800 and the valve assembly 400. In the engine start/stop mode 360, fluid is supplied to the fluid demand devices and/or systems 220 by the electric pump 206. More specifically, as indicated by arrows 362, fluid is supplied to the devices and/or systems 220 by the pump 206 in the mode 360 through the valve assembly 400 without passing through the filter element 800.

It should be appreciated that in the engine runtime mode 250, the mechanical pump 204 is driven (e.g., by the drive unit 102) such that fluid pressure is provided to the fluid demand devices and/or systems 220 by the pump 204 alone. Additionally, it should be appreciated that in the engine start/stop mode 360, the pump 204 is not driven and therefore fluid pressure is provided to the devices and/or systems 220 by the pump 206 alone. However, it should be appreciated that the transmission 102 may be operated in other suitable operating modes, such as one or more modes in which fluid pressure may be cooperatively provided to the devices and/or systems 220 by the pumps 204, 206, for example.

Figure 4:
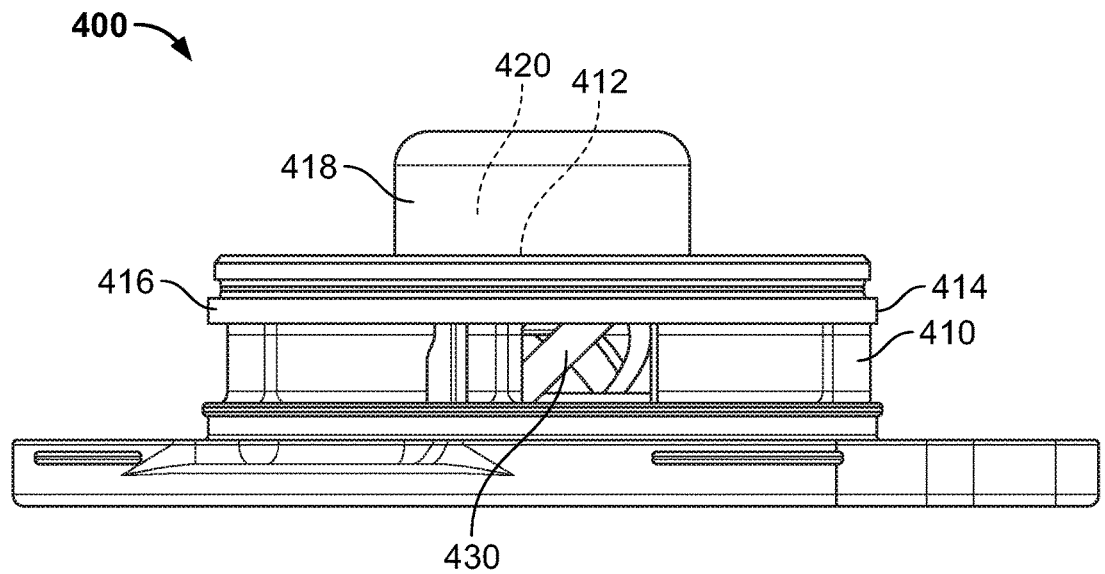
FIG. 4 is front elevation view of a valve assembly included in the hydraulic system diagrammatically depicted in FIG. 2.
Figure 8:
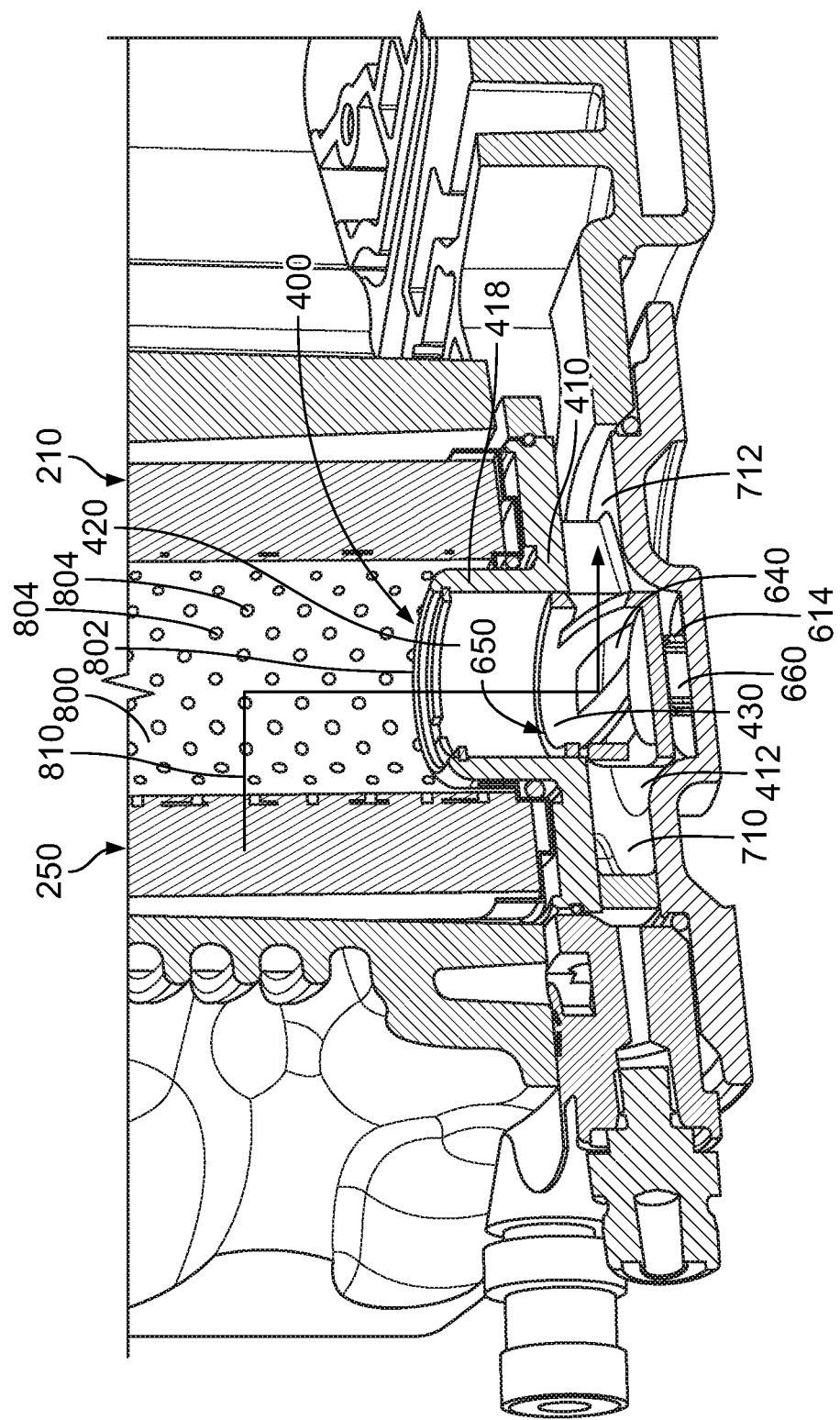
FIG. 8 is a perspective view of the valve assembly of FIG. 4 installed in a filter assembly of the hydraulic system of the transmission.

Referring now to FIG. 4, the illustrative valve assembly 400 is assembled such that a cover 414 of the housing 410 at least partially defines the interior chamber 412 of the housing 410. The cover 414 includes an annular collar 416 and a pedestal 418 that extends outwardly away from the collar 416. When the assembled valve assembly 400 is incorporated into the filter assembly 210 as best seen in FIG. 8, the filter element 800 may extend around and over the pedestal 418 such that the filter element 800 is fluidly coupled to or in fluid communication with the interior chamber 412 through an inlet passage 420 formed in the pedestal 418. As such, in the illustrative embodiment, the interior chamber 412 is not completely closed off by the cover 414.

Figure 5:
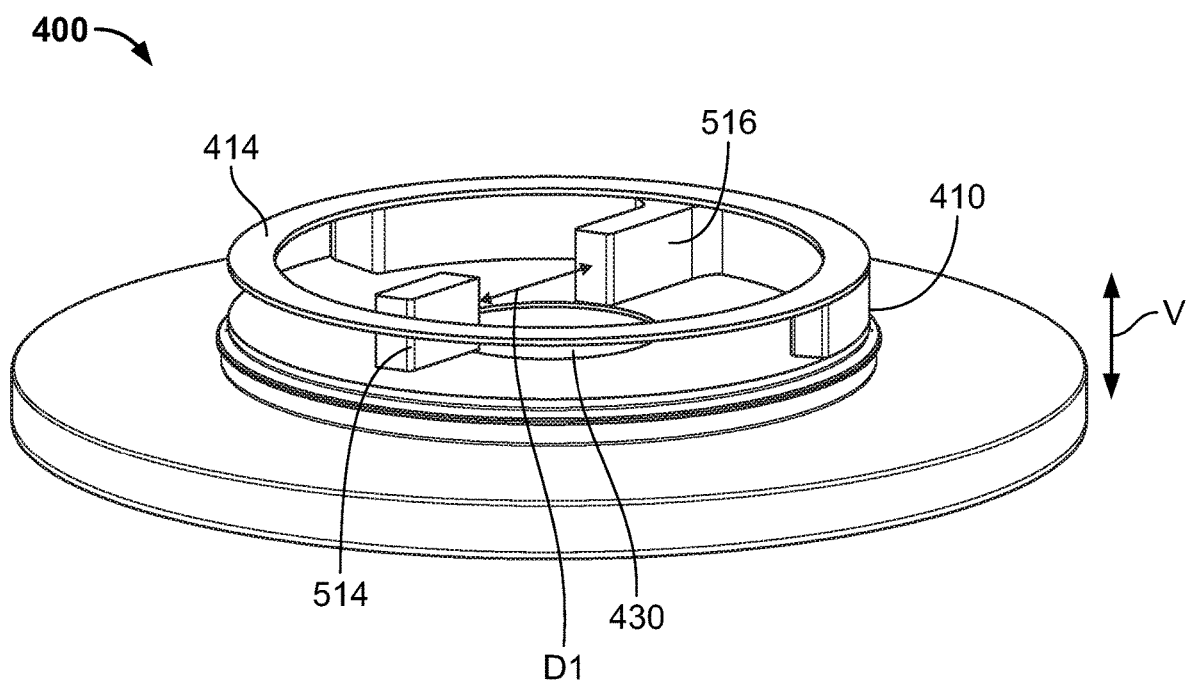
FIG. 5 is a perspective view of a housing of the valve assembly of FIG. 4 with certain features omitted for the sake of clarity.

Referring now to FIG. 5, the cover 414 of the housing 410 is depicted in greater detail. In the illustrative embodiment, the cover 414 includes a pair of support ribs 514, 516 that extend in a vertical direction indicated by arrow V. At least in some embodiments, the support ribs 514, 516 are spaced from one another by a distance D1 and at least partially define the interior chamber 412. In such embodiments, the support ribs 514, 516 are configured for interaction with the spool 430 to guide movement of the spool 430 in the interior chamber 412.

Referring now to FIG. 6, in the illustrative embodiment, the valve assembly 400 includes the housing 410, the spool 430, a biasing element 660, and a snap ring 670. Of course, it should be appreciated that in other embodiments, the valve assembly 400 may include additional components. In any case, the spool 430, the biasing element 660, and the snap ring 670 are at least partially positioned in the interior chamber 412 and housed in the housing 410.

The illustrative spool 430 is movably disposed in the interior chamber 412 such that the spool 430 is fluidly coupled to or in fluid communication with the inlet passage 420 of the housing 410. The spool 430 includes a base 630 and an annular body 636 that extends outwardly away from the base 630. The base 630 includes surfaces 632, 634 that are arranged opposite one another. The annular body 636 has a closed end 638 that is closed off by the base 630 and arranged adjacent thereto and an open end 642 that is arranged opposite the closed end 638. In the illustrative embodiment, the spool 430 extends in a vertical direction indicated by arrow V1 from the open end 642 to the surface 634 of the base 630.

In the illustrative embodiment, the base 630 of the spool 430 is configured to receive fluid pressure FP applied to the surface 632 thereof by fluid passed through the filter element 800 and the inlet passage 420 in use of the valve assembly 400. The illustrative base 630 is devoid of any apertures. The illustrative base 630 is shaped for interaction with one or more interior walls 610 of the housing 410 that at least partially define the interior chamber 412 to facilitate a tight-tolerance fit between the base 630 and the housing 410. Put differently, the base 630 and the one or more interior walls 610 are shaped complementary to one another and sized for interaction with one another to facilitate sealing of the interior chamber 412 without a separate seal.

In the illustrative embodiment, the body 636 of the spool 430 is formed to include the spiraled slots 640. An exterior 646 of the body 636 is shaped for interaction with the one or more interior walls 610 of the housing 410 to facilitate a tight-tolerance fit between the body 636 and the housing 410. Put another way, the body 636 and the one or more interior walls 610 are shaped complementary to one another and sized for interaction with one another to facilitate sealing of the interior chamber 412 without a separate seal. The tight-tolerance fit between each of the base 630 and the body 636 and the one or more interior walls 610 resists leakage of fluid through the interior chamber 412 around the spool 430.

The illustrative spiraled slots 640 formed in the spool 430 are shaped to conduct fluid therethrough to permit predetermined or reference fluid flow to the fluid demand devices and/or systems 220 to be achieved through the valve assembly 400 in use thereof. Accordingly, it should be appreciated that the shape of the slots 640 may correspond to, or otherwise be associated with, desired fluid flow characteristics that may not be attained in other configurations, such as configurations in which slots are not employed or configurations in which slots having different shapes are utilized, for example. In any case, with respect to the slots 640, the adjective "spiraled" is employed herein to connote extension in a swirled, winding, coiled, helical, or twisted manner.

In some embodiments, at least one of the slots 640 may be defined by faces 636A, 636B, 636C, 636D of the body 636. The faces 636A, 636D may be generally planar and extend substantially parallel to one another. The faces 636A, 636D may be interconnected with one another by the faces 636B, 636C, which may each be at least partially arcuate.

In the illustrative embodiment, the spool 430 and the interior chamber 412 each have a generally circular cross-sectional shape. It should be appreciated that in other embodiments, however, the spool 430 and the interior chamber 412 may each have another suitable cross-sectional shape to effect the tight-tolerance fit discussed above, and to seal the interior chamber 412 without a separate seal as discussed above.

The illustrative biasing element 660 is arranged in contact with the housing 410 and the spool 430 to bias the spool 430 toward the de-stroked position 760. More specifically, the biasing element 660 is arranged in contact with a floor 612 of the housing 410 and the surface 634 of the base 630 of the spool 430 to bias the spool 430 toward the de-stroked position 760. At least in some embodiments, the housing 410 may include a retainer 614 coupled to, or integrally formed with, the floor 612. In such embodiments, the retainer 614 may be configured to secure the biasing element 660 in contact with the floor 612 throughout operation of the valve assembly 400.

The illustrative biasing element 660 is embodied as, or otherwise includes, any device or collection of devices capable of exerting a biasing force BF on the spool 430 to bias the spool 430 toward the de-stroked position 760. Because application of fluid pressure FP to the spool 430 causes compression of the biasing element 660 as discussed below, in the illustrative embodiment, the biasing element 660 is embodied as, or otherwise includes, a compression spring. In some embodiments, the biasing element 660 may be embodied as, or otherwise include, a coil spring, a helical spring, a volute spring, a balance spring, a leaf spring, a Belleville spring, a wave spring, a V-spring, or the like. Of course, in other embodiments, it should be appreciated that the biasing element 660 may be embodied as, or otherwise include, another suitable biasing device.

The illustrative snap ring 670 is retained by the cover 414 of the housing 410 and positioned in the interior chamber 412. In the illustrative embodiment, the snap ring 670 is positioned in the interior chamber 412 to restrict movement of the spool 430 in the interior chamber 412. Accordingly, the illustrative snap ring 670 is embodied as, or otherwise includes, any device or collection of devices capable of being retained by the cover 414 and positioned in the interior chamber 412 to restrict movement of the spool 430 therein. In some embodiments, the snap ring 670 may be embodied as, or otherwise include, a tapered section retaining ring, a beveled retaining ring, a bowed retaining ring, a self-locking retaining ring, a spiral retaining ring, a constant section retaining ring, a push-on ring, or the like. Of course, in other embodiments, it should be appreciated that the snap ring 670 may be embodied as, or otherwise include, another suitable device.

Referring now to FIGS. 6 and 7, operation of the illustrative valve assembly 400 will be described in greater detail. For the purposes of the present disclosure, the engine runtime mode 250 of the transmission 120 corresponds to, or is otherwise associated with, the stroked position 650 of the spool 430 depicted in FIG. 6. Additionally, for the purposes of the present disclosure, the engine start/stop mode 360 of the transmission 120 corresponds to, or is otherwise associated with, the de-stroked position 760 of the spool 430 depicted in FIG. 7. For consistency with the description of the operational sequence of the transmission 120 provided below with reference to FIG. 10, operation of the illustrative valve assembly 400 is described first with respect to the engine start/stop mode 360 and second with respect to the engine runtime mode 250.

When the transmission 120 is in the engine start/stop mode 360, the mechanical pump 204 is not mechanically driven by the drive unit 102. As a result, substantially no fluid is supplied to the inlet passage 420 by the pump 204 such that substantially no fluid pressure is applied to the surface 632 of the spool 430. Because substantially no fluid pressure is applied to the surface 632 of the spool 430, the biasing force BF applied to the surface 634 of the spool 430 by the biasing element 660 urges the spool 430 to the de-stroked position 760 in which the spool 430 contacts the snap ring 670.

When the spool 430 is in the de-stroked position 760, fluid supplied by the electric pump 206 is provided to the interior chamber 412 and conducted through outlet ports 710, 712 that are fluidly coupled to the chamber 412 as indicated by arrows 708. Fluid supplied by the pump 206 may be provided to the interior chamber 412 by a second inlet passage (not shown). Regardless, when the spool 430 is in the de-stroked position 760, fluid supplied by the pump 206 is conducted through the interior chamber 412, discharged by the outlet ports 710, 712, and provided to the fluid demand devices and/or systems 220 in the engine start/stop mode 360 of the transmission 120.

When the spool 430 contacts the snap ring 670 in the de-stroked position 760, the spiraled slots 640 formed in the spool 430 are substantially closed off by the one or more interior walls 610 of the housing 410 to resist fluid flow therethrough. Due at least in part to the tight-tolerance fit between the base 630 and the one or more interior walls 610, the spool 430 blocks fluid backflow through the interior chamber 412 to the filter element 800 through the passage 420 when the spool 430 is in the de-stroked position 760. In that fashion, when the spool 430 is in the de-stroked position 760, the spool 430 blocks fluid backflow from the electric pump 206 to the mechanical pump 204.

Now, when the transmission 120 is in the engine runtime mode 250, the mechanical pump 204 is driven by the drive unit 102. Consequently, fluid supplied by the pump 204 is passed through the filter element 800 and provided to the inlet passage 420 such that fluid pressure FP is applied to the surface 632 of the spool 430. Sufficient fluid pressure FP applied to the surface 632 causes movement of the spool 430 in the interior chamber 412 to the stroked position 650 against the biasing force BF applied to the surface 634 by the biasing element 660.

When the spool 430 is in the stroked position 650, fluid supplied by the mechanical pump 204 is passed through the filter element 800, provided to the interior chamber 412 via the passage 420, and conducted through the spiraled slots 640 and the outlet ports 710, 712 as indicated by arrows 608. As such, when the spool 430 is in the stroked position 650, fluid supplied by the pump 204 is conducted through the interior chamber 412 and the slots 640, discharged by the outlet ports 710, 712, and provided to the fluid demand devices and/or systems 220 in the engine runtime mode 250 of the transmission 120.

Referring now to FIG. 8, the filter assembly 210 is shown in the engine runtime mode 250 of the transmission 102. As indicated above, the spool 430 is in the stroked position 650 in the interior chamber 412 of the housing 410 when the transmission 102 is in the mode 250. As indicated by arrow 810, fluid supplied by the pump 204 is passed through the filter element 800 and conducted through the inlet passage 420 and the interior chamber 412 to the outlet port 712 in the mode 250. Fluid conducted to the output port 712 is illustratively provided to the fluid demand devices and/or systems 220 as discussed above.

In the illustrative embodiment, the filter element 800 is formed to include a cavity 802 that is sized to receive the pedestal 418 of the cover 414 of the valve assembly 400. When the pedestal 418 is positioned in the cavity 802 as shown in FIG. 8, the filter element 800 illustratively extends at least partway around the pedestal 418. The illustrative filter element 800 includes apertures 804 that are fluidly coupled to or in fluid communication with the inlet passage 420. As indicated by arrow 810, fluid is conducted through the apertures 804 to the inlet passage 420 in the engine runtime mode 250 of the transmission 120.

The illustrative filter element 800 is embodied as, or otherwise includes, any device or collection of devices capable of filtering fluid supplied thereto by the mechanical pump 204 in the engine runtime mode 250 of the transmission 120 to remove particulates, foreign matter, and/or contaminants from the fluid. In the illustrative embodiment, the filter element 800 is embodied as, or otherwise includes, a filter element adapted for use with hydraulic fluid, engine oil, transmission oil, and/or lubricating fluid. In some embodiments, the filter element 800 may be embodied as, or otherwise include, a cartridge-type filter, a spin-on filter, a magnetic filter, a gravity bed filter, a centrifugal filter, a high efficiency filter, or the like. Of course, it should be appreciated that in other embodiments, the filter element 800 may be embodied as, or otherwise include, another suitable filter device.

Figure 9:
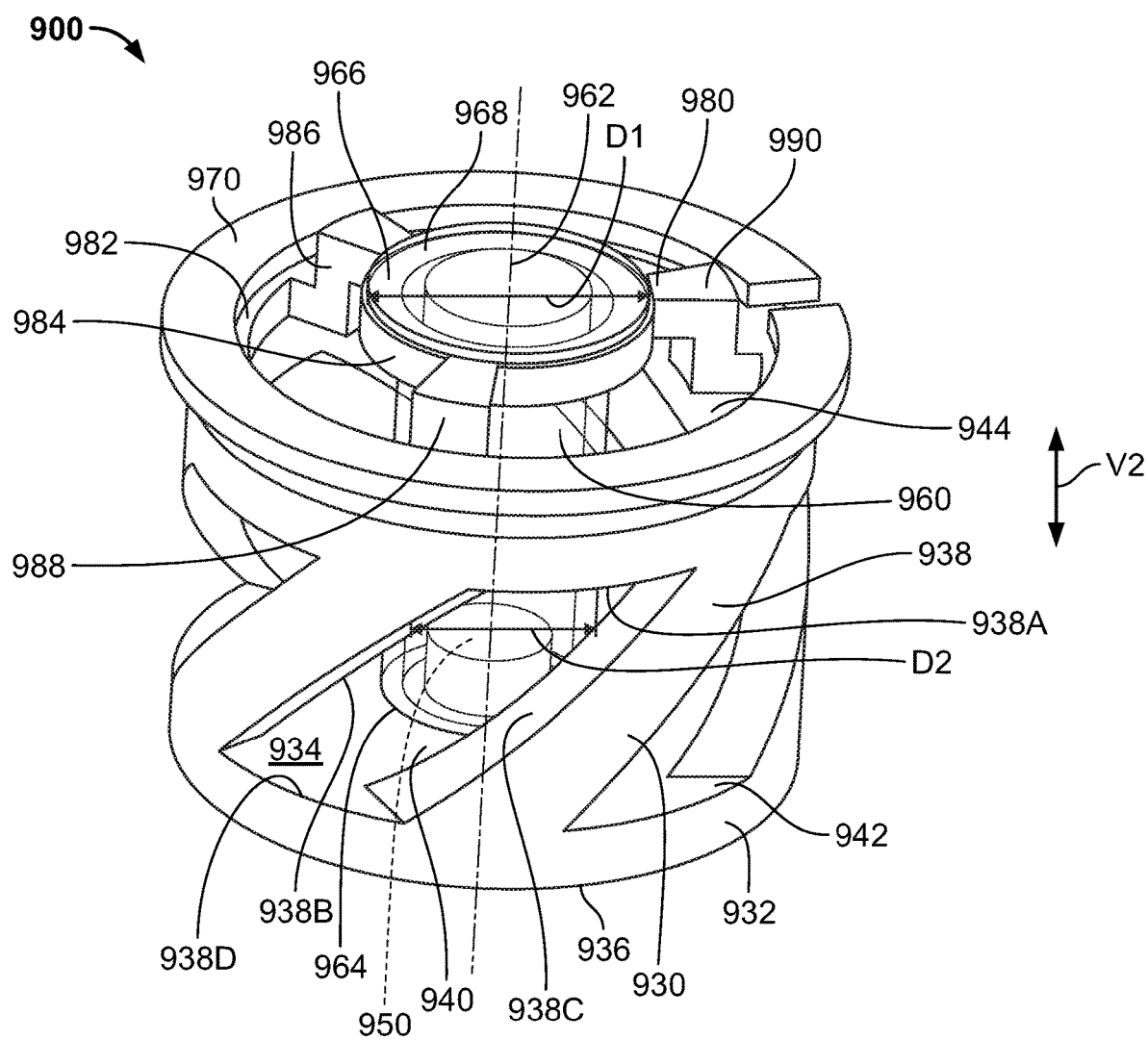
FIG. 9 is a perspective view of a portion of another valve assembly adapted for use in the hydraulic system of FIG. 2.

Referring now to FIG. 9, an illustrative valve assembly 900 is adapted for inclusion in the filter assembly 210 in substantially similar fashion to the valve assembly 400. For the sake of simplicity, certain features (e.g., a housing that houses components of the valve assembly 900 in an interior chamber thereof) of the valve assembly 900 and/or the installation environment for the valve assembly 900 are omitted. In any case, in the illustrative embodiment, the valve assembly 900 includes a spool 930, a central post 950, a biasing element 960, a snap ring 970, and a retention cage 980.

The illustrative spool 930 is substantially similar to the spool 430 of the valve assembly 400. The spool 930 includes a base 932 and an annular body 938 that extends outwardly away from the base 932. The base 932 is devoid of any apertures and includes surfaces 934, 936 that are arranged opposite one another. The annular body 938 has a closed end 942 that is closed off by the base 932 and arranged adjacent thereto and an open end 944 that is arranged opposite the closed end 942. In the illustrative embodiment, the spool 930 extends in a vertical direction indicated by arrow V2 from the open end 944 to the surface 936 of the base 932.

In the illustrative embodiment, the body 938 of the spool 930 is formed to include spiraled slots 940. The illustrative spiraled slots 940 are shaped to conduct fluid therethrough to permit predetermined or reference fluid flow to fluid demand devices and/or systems (e.g., the devices and/or systems 220) to be achieved through the valve assembly 900 in use thereof. Accordingly, it should be appreciated that the shape of the slots 940 may correspond to, or otherwise be associated with, desired fluid flow characteristics that may not be attained in other configurations, such as configurations in which slots are not employed or configurations in which slots having different shapes are utilized, for example. In any case, with respect to the slots 940, the adjective "spiraled" is employed herein to connote extension in a swirled, winding, coiled, helical, or twisted manner.

In some embodiments, at least one of the slots 940 may be defined by faces 938A, 938B, 938C, 938D of the body 938. The faces 938A, 938D may be generally planar and extend substantially parallel to one another. The faces 938A, 938D may be interconnected with one another by the faces 938B, 938C, which may each be at least partially arcuate.

The illustrative central post 950 is interconnected with, and extends outwardly away from, the surface 934 of the spool 930. The central post 950 is configured for interaction with the biasing element 960 and, at least in some embodiments, the central post 950 is sized to be received by the biasing element 960. Additionally, in some embodiments, the central post 950 may be configured for interaction with the biasing element 960 to guide deflection, compression, and/or movement of the biasing element 960 along a vertical axis 962.

The illustrative biasing element 960 is similar to the biasing element 660 of the valve assembly 400. The biasing element 960 is arranged in contact with the surface 934 of the spool 930 at an end 964 thereof and in contact with the retention cage 980 at an end 966 arranged opposite the end 962. At least in some embodiments, the end 966 may be defined by a retention flange 968 of the biasing element 960 that has a diameter D1. In such embodiments, the diameter D1 may be greater than a diameter D2 of a body 969 of the biasing element 960.

The illustrative snap ring 970 is similar to the snap ring 670 of the valve assembly 400. The illustrative snap ring 970 is embodied as, or otherwise includes, any device or collection of devices capable of being retained by a housing (e.g., a cover of a housing similar to the cover 414) and positioned in the interior chamber thereof (e.g., an interior chamber similar to the chamber 412) to restrict movement of the spool 930 therein. In some embodiments, the snap ring 970 may be embodied as, or otherwise include, a tapered section retaining ring, a beveled retaining ring, a bowed retaining ring, a self-locking retaining ring, a spiral retaining ring, a constant section retaining ring, a push-on ring, or the like. Of course, in other embodiments, it should be appreciated that the snap ring 970 may be embodied as, or otherwise include, another suitable device.

The illustrative retention cage 980 is coupled to the spool 930 and arranged adjacent the open end 944 of the spool 930. The retention cage 980 includes an outer ring 982, an inner ring 984, and retention arms 986, 988, 990 that interconnect the outer ring 982 and the inner ring 984. The outer ring 982 is configured for interaction with the spool 930 proximate the open end 944 thereof, and at least in some embodiments, the outer ring 982 may be configured for interaction with the snap ring 970. The inner ring 984 is sized to receive the retention flange 966 of the biasing element 960 such that the inner ring 984 extends all the way around the retention flange 966. The retention arms 986, 988, 990 each extend interiorly from the outer ring 982 to the inner ring 984.

Figure 10:
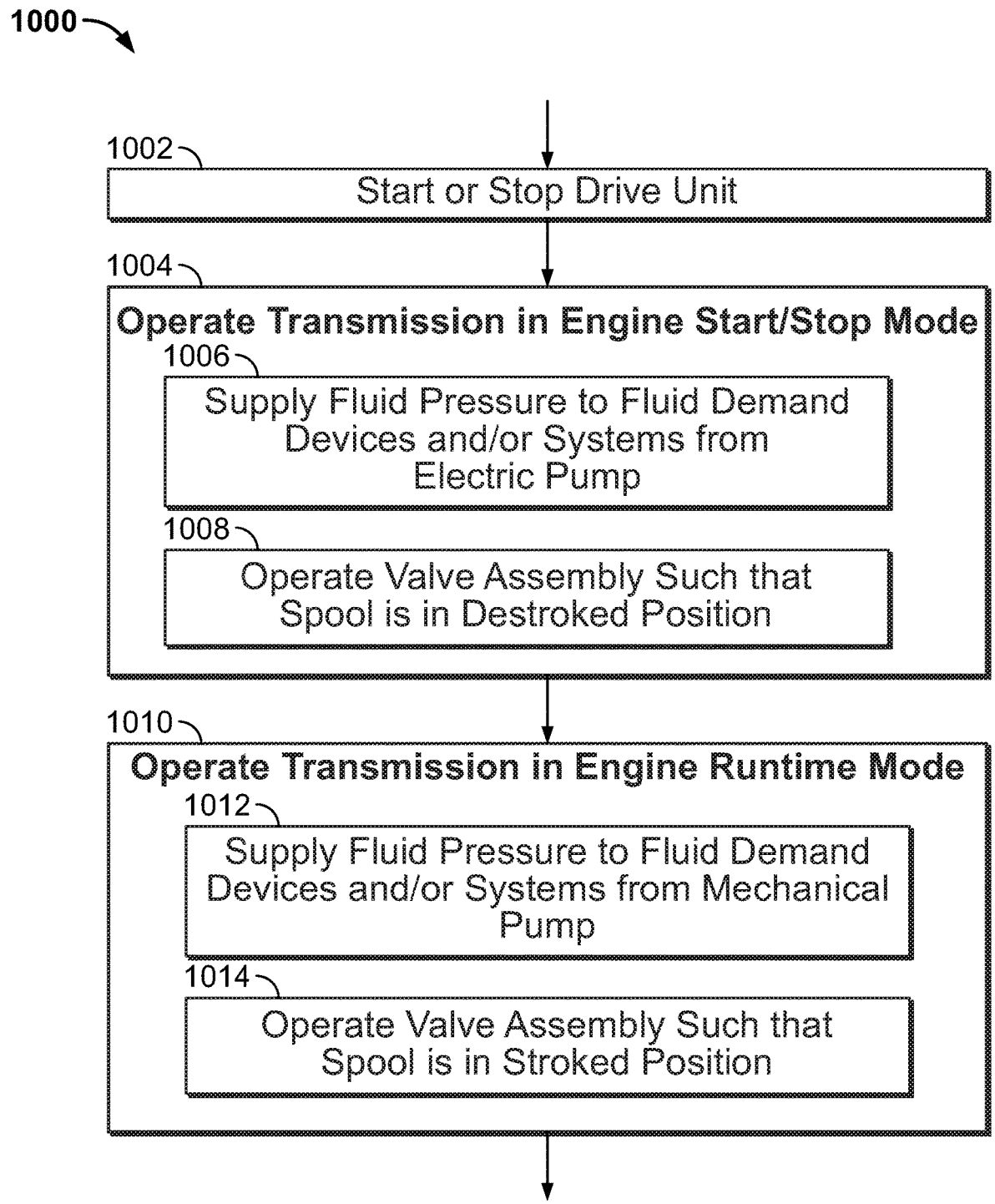
FIG. 10 is a simplified flowchart of a method of operating the transmission of the drive system of FIG. 1.

Referring now to FIG. 10, an illustrative method 1000 of operating the transmission 120 may be performed manually (e.g., by an operator) and/or automatically by one or more components of the hydraulic system 200 under control by the controller 190. The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, the drive unit 102 is started or stopped. Block 1002 may correspond to, or otherwise be associated with, an initial startup of the vehicle that includes the drive system 100. Additionally, block 1002 may correspond to, or otherwise be associated with, starting or stopping of the drive unit 102 subsequent to initial startup. In any case, from block 1002, the method 1000 subsequently proceeds to block 1004.

In block 1004 of the illustrative method 1000, the transmission 120 is operated in the engine start/stop mode 360. To perform block 1004, fluid pressure is supplied from the electric pump 206 to the fluid demand devices and/or systems 220 in block 1006. To supply fluid pressure from the pump 206 to the devices and/or systems 220 in block 1006, block 1008 is performed. In block 1008, the valve assembly 400, 900 is operated such that the spool 430, 930 is in the de-stroked position 760. Following completion of block 1004, the method 1000 subsequently proceeds to block 1010.

In block 1010 of the illustrative method 1000, the transmission 120 is operated in the engine runtime mode 250. To perform block 1010, fluid pressure is supplied from the mechanical pump 204 to the fluid demand devices and/or systems 220 in block 1012. To supply fluid pressure from the pump 204 to the devices and/or systems 220 in block 1012, block 1014 is performed. In block 1014, the valve assembly 400, 900 is operated such that the spool 430, 930 is in the stroked position 650.

The present disclosure provides an integrated check valve mechanism (e.g., each of the valve assemblies 400, 900) that may be integrated into a transmission filter assembly (e.g., the filter assembly 210). The mechanism may be configured to regulate the flow of hydraulic main pressure provided by a mechanical pump (e.g., the pump 204) during an engine runtime operating mode (e.g., the mode 250). Additionally, the mechanism may be configured to regulate the flow of hydraulic main pressure provided by an electric pump (e.g., the pump 206) during an engine start/stop mode (e.g., the mode 360).

The installation environment for the mechanism envisioned by the present disclosure may correspond to, or otherwise be associated with, limitations imposed by physical space and fluid flow demands. In view of those limitations, the present disclosure provides a unique slotted bypass valve (e.g., the spools 430, 930 of the valve assemblies 400, 900) for delivering hydraulic main pressure supplied by a mechanical pump and an electric pump. It should be appreciated that performance of conventional devices, such as common check valves, for example, may not suffice to address the limitations contemplated by the present disclosure.

The valve assemblies (e.g., the valve assemblies 400, 900) of the present disclosure may incorporate a cast filter body (e.g., the housing 410), a relatively large, slotted piston valve (e.g., one of the spools 430, 930), a return spring (e.g., one of the biasing elements 660, 960), a snap ring (e.g., one of the snap rings 670, 970), and two options for assembly retention. In use, the valve assemblies (e.g., the spools 430, 930) are configured for vertical movement (e.g., between the de-stroked position 760 and the stroked position 650) to allow flow in one direction for individual usage of the mechanical pump or the electric pump. Performance of the valve assemblies of the present disclosure may be adequate to address the aforementioned limitations.

Notably, in some embodiments of the present disclosure, no sealing device (e.g., an O-ring) may be employed to seal hydraulic main pressure flow (e.g., between the spool 430 and the housing 410) when the transmission (e.g., the transmission 120) is operated in the engine start/stop mode. Rather, in such embodiments, a tight-tolerance fit between the valve (e.g., the spool 430) and the bore (e.g., the interior chamber 412 defined by the one or more interior walls 610 of the housing 410) may provide the desired seal. However, in other embodiments, a separate sealing device may be employed to seal hydraulic main pressure flow when the transmission is in the engine start/stop mode.

The present disclosure may be directed toward creation of a valve to selectively deliver and/or block fluid flow supplied by a mechanical pump or an electric pump in a predetermined installation environment, such as a filter assembly for a 3000 or 4000 series transmission manufactured by Allison Transmission, Inc., for example. In that environment, the valve may be adapted for use with, or otherwise incorporated in, one or more hydraulic circuits (e.g., circuits included in the hydraulic system 200) that are used to conduct hydraulic supplied by multiple pumps along multiple flow paths. Additionally, that environment may be characterized by, or otherwise associated with, use of a mechanical pump driven by an engine (e.g., the drive unit 102) to supply hydraulic main pressure in one mode, as well as use of an electric pump to supply a reduced hydraulic main pressure in another mode.

The present disclosure may provide a large valve with angled slots (e.g., the spiraled slots 640, 940). When the valve (e.g., the spool 430) moves in response to main pressure being applied thereto, the valve may permit attainment of desired fluid flow characteristics that other configurations may not achieve. The valve may be returned by a spring (e.g., one of the biasing elements 660, 960) and the assembly may be contained by a snap ring (e.g., one of the snap rings 670, 970). The assembly may contain fewer parts than other configurations, thereby facilitating reduced complexity. Additionally, compared to other configurations, the extent to which main pressure flow through a feed bore of the filter element (e.g., the filter element 800) is hampered by the assembly may be minimized. Furthermore, the slots in the valve may provide angled walls to support the valve stroke function on multiple rib surfaces (e.g., surfaces provided by the ribs 514, 516) provided in the base casting.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission for a vehicle, the transmission comprising:
an input shaft configured to receive rotational power supplied by a drive unit;
an output shaft coupled to the input shaft and configured to provide rotational power supplied to the input shaft to a load; and
a hydraulic system configured to supply fluid to one or more fluid demand devices coupled between the input shaft and the output shaft in one or more operating modes of the transmission, wherein the hydraulic system includes a filter assembly having a filter element and a valve assembly fluidly coupled to the filter element, wherein the valve assembly includes
a housing having an interior chamber; and
a spool movable in the interior chamber between a de-stroked position, in which the spool permits fluid flow through the valve assembly to the one or more fluid demand devices substantially without application of fluid pressure to the spool by fluid passed through the filter element, and a stroked position, in which the spool permits fluid flow through the valve assembly to the one or more fluid demand devices in response to fluid pressure applied to the spool by fluid passed through the filter element,
wherein the spool is formed to include a plurality of spiraled slots shaped to conduct fluid therethrough when the spool is in the stroked position to improve fluid flow to the one or more fluid demand devices through the valve assembly.

2. The transmission of claim 1, wherein when the spool is in the de-stroked position, the spool blocks fluid backflow through the valve assembly to the filter element.

3. The transmission of claim 1, wherein the one or more operating modes include a first operating mode in which fluid is supplied to the one or more fluid demand devices by a first pump of the hydraulic system that is mechanically driven by the drive unit, and wherein when the transmission is in the first operating mode, the spool is in the stroked position such that the spool permits flow of fluid supplied by the first pump through the valve assembly to the one or more fluid demand devices.

4. The transmission of claim 3, wherein the one or more operating modes include a second operating mode in which fluid is supplied to the one or more fluid demand devices by a second electrically-driven pump of the hydraulic system, and wherein when the transmission is in the second operating mode, the spool is in the de-stroked position such that the spool permits flow of fluid supplied by the second pump through the valve assembly to the one or more fluid demand devices.

5. The transmission of claim 1, wherein the valve assembly includes a biasing element arranged in contact with the housing and the spool to bias the spool toward the de-stroked position and a snap ring positioned in the interior chamber to restrict movement of the spool in the interior chamber.

6. The transmission of claim 5, wherein the housing includes a cover that retains the snap ring and has a pair of support ribs, and wherein the pair of support ribs are configured for interaction with the spool to guide movement of the spool in the interior chamber.

7. The transmission of claim 1, wherein the spool includes a base devoid of any apertures and an annular body that extends outwardly away from the base and that has a closed end arranged adjacent the base and an open end arranged opposite the closed end, wherein the plurality of spiraled slots are formed in the annular body, and wherein the base is configured to receive fluid pressure applied by fluid passed through the filter element to cause movement of the spool in the interior chamber from the de-stroked position to the stroked position.

8. The transmission of claim 7, wherein an exterior of the annular body is shaped for interaction with one or more interior walls of the housing that at least partially define the interior chamber to facilitate a tight-tolerance fit between the spool and the housing that resists leakage of fluid through the interior chamber around the spool.

9. The transmission of claim 8, wherein the spool and the one or more interior walls of the housing are shaped complementary to one another and sized for interaction with one another to facilitate sealing of the interior chamber without a separate seal.

10. The transmission of claim 7, wherein the valve assembly includes a biasing element arranged in contact with the housing and the base of the spool to bias the spool toward the de-stroked position and a snap ring positioned in the interior chamber to restrict movement of the spool in the interior chamber.

11. A filter assembly for use in a hydraulic system of a transmission, the filter assembly comprising:
   a filter element; and
   a valve assembly in fluid communication with the filter element, the valve assembly including
      a housing having an interior chamber; and
      a spool formed to include a plurality of spiraled slots that is movable in the interior chamber between a de-stroked position, in which the spool permits fluid flow through the valve assembly to one or more fluid demand devices substantially without application of fluid pressure to the spool by fluid passed through the filter element, and a stroked position, in which the spool permits fluid flow through the spiraled slots to the one or more fluid demand devices in response to fluid pressure applied to the spool by fluid passed through the filter element,
      wherein when the spool is in the de-stroked position, the spool blocks fluid backflow through the valve assembly to the filter element.

12. The filter assembly of claim 11, wherein the spool includes a base devoid of any apertures and an annular body that extends outwardly away from the base and that has a closed end arranged adjacent the base and an open end arranged opposite the closed end, wherein the plurality of spiraled slots are formed in the annular body, and wherein a first side of the base is configured to receive fluid pressure applied by fluid passed through the filter element to cause movement of the spool in the interior chamber from the de-stroked position to the stroked position.

13. The filter assembly of claim 12, wherein the valve assembly includes a biasing element arranged in contact with the housing and a second side of the base arranged opposite the first side to bias the spool toward the de-stroked position and a snap ring positioned in the interior chamber to restrict movement of the spool in the interior chamber.

14. The filter assembly of claim 12, wherein an exterior of the annular body is shaped for interaction with one or more interior walls of the housing that at least partially define the interior chamber to facilitate a tight-tolerance fit between the spool and the housing that resists leakage of fluid through the interior chamber around the spool, and wherein the spool and the one or more interior walls of the housing are shaped complementary to one another and sized for interaction with one another to facilitate sealing of the interior chamber without a separate seal.

15. The filter assembly of claim 14, wherein when the spool is in the de-stroked position, the one or more interior walls of the housing substantially close off the spiraled slots of the spool to resist fluid flow therethrough.

16. A valve assembly for use in a hydraulic system of a transmission, the valve assembly comprising:
   a housing having an interior chamber;
   a spool positioned in the interior chamber that is formed to include a plurality of spiraled slots; and
   a biasing element arranged in contact with the spool to apply a biasing force to the spool,
   wherein the spool is movable in the interior chamber between a de-stroked position, in which the spool permits fluid flow through the valve assembly to one or more fluid demand devices substantially without application of fluid pressure to the spool, and a stroked position, in which the spool permits fluid flow through the spiraled slots to the one or more fluid demand devices in response to fluid pressure applied to the spool, and wherein the biasing force urges the spool toward the de-stroked position.

17. The valve assembly of claim 16, further comprising a snap ring positioned in the interior chamber to restrict movement of the spool in the interior chamber.

18. The valve assembly of claim 17, wherein the housing includes a cover that retains the snap ring and has a pair of support ribs, and wherein the pair of support ribs are configured for interaction with the spool to guide movement of the spool in the interior chamber.

19. The valve assembly of claim 16, wherein the spool includes a base devoid of any apertures and an annular body that extends outwardly away from the base and that has a closed end arranged adjacent the base and an open end arranged opposite the closed end, wherein the plurality of spiraled slots are formed in the annular body, and wherein the base is configured to receive fluid pressure to cause movement of the spool in the interior chamber from the de-stroked position to the stroked position.

20. The valve assembly of claim 19, wherein an exterior of the annular body is shaped for interaction with one or more interior walls of the housing that at least partially define the interior chamber to facilitate a tight-tolerance fit between the spool and the housing that resists leakage of fluid through the interior chamber around the spool, and wherein the spool and the one or more interior walls of the housing are shaped complementary to one another and sized for interaction with one another to facilitate sealing of the interior chamber without a separate seal.

* * * * *